(12) United States Patent
Otto

(10) Patent No.: US 11,777,537 B2
(45) Date of Patent: Oct. 3, 2023

(54) TACTICAL COMMUNICATION APPARATUS

(71) Applicant: Kevin Otto, Milwaukee, WI (US)

(72) Inventor: Kevin Otto, Milwaukee, WI (US)

( * ) Notice: Subject to any disclaimer, the term of this patent is extended or adjusted under 35 U.S.C. 154(b) by 210 days.

(21) Appl. No.: 17/469,869

(22) Filed: Sep. 8, 2021

(65) Prior Publication Data
US 2022/0077881 A1    Mar. 10, 2022

Related U.S. Application Data

(60) Provisional application No. 63/075,519, filed on Sep. 8, 2020.

(51) Int. Cl.
| | |
|---|---|
| *H04B 1/16* | (2006.01) |
| *H04W 4/00* | (2018.01) |
| *H04B 1/034* | (2006.01) |
| *H04B 1/08* | (2006.01) |
| *F41B 9/00* | (2006.01) |
| *F42B 1/02* | (2006.01) |
| *F41H 13/00* | (2006.01) |
| *H04N 7/14* | (2006.01) |
| *H04W 4/90* | (2018.01) |

(52) U.S. Cl.
CPC ......... *H04B 1/034* (2013.01); *F41B 9/0006* (2013.01); *F41B 9/0084* (2013.01); *F41H 13/0081* (2013.01); *F42B 1/02* (2013.01); *H04B 1/086* (2013.01); *H04N 7/141* (2013.01); *H04W 4/90* (2018.02)

(58) Field of Classification Search
CPC ....... H04B 1/034; H04B 1/086; F41B 9/0006; F41B 9/0084; F41H 13/0081; F41H 9/10; F42B 1/02; F42B 23/10; H04N 7/141; H04N 7/142; H04W 4/90; F41C 9/00
USPC .......................................................... 455/460
See application file for complete search history.

(56) References Cited

U.S. PATENT DOCUMENTS

| | | | |
|---|---|---|---|
| 5,574,771 A | 11/1996 | Driessen et al. | |
| 6,442,240 B1 * | 8/2002 | Otto .................... | H04N 7/14 348/14.05 |

(Continued)

OTHER PUBLICATIONS

Caliber_MK4_datasheet by ICOR technology, Apr. 4, 2019 (See attached wayback) (Year: 2019).*

(Continued)

*Primary Examiner* — Tanmay K Shah

(57) ABSTRACT

A tactical communications apparatus is used to establish secure, reliable communications between a forward-deployed communications station and any designated second communicator during a building siege or hostage situation. At least one communications device, at least one processing unit, a transceiver array, and a power supply are mounted to a casing. The casing allows the tactical communication apparatus to be tossed into an area. The transceiver array wirelessly connects to at least one remote terminal, enabling communication via the at least one communication device. The casing also contains a plurality of discrete surveillance devices mounted into the casing to enable an operator to remotely surveil the area around the casing. Further, the tactical communication apparatus also supports at least one offensive device operated via the at least one remote terminal. The at least one offensive device may be activated as cover for responders if communications fail to resolve a situation.

20 Claims, 9 Drawing Sheets

(56) References Cited

U.S. PATENT DOCUMENTS

2004/0185902 A1    9/2004  Yang
2017/0372143 A1*  12/2017  Barcus .................. G06V 20/54
2019/0166479 A1*  5/2019  Otto ....................... G16H 40/67

OTHER PUBLICATIONS

Wayback internet archive showing the date of Caliber_MK4_ pulbication date (Year: 2019).*
Avaya, Avaya Vantage Corded Handset With Cradle Kit, headsetstore.global-tech.com, Aug. 2020.
Cobra Firing Systems, Command Center, cobrafiringsystems.com, Aug. 2020.

* cited by examiner

TACTICAL COMMUNICATION APPARATUS

The current application claims a priority to the U.S. Provisional Patent application Ser. No. 63/075,519 filed on Sep. 8, 2020.

FIELD OF THE INVENTION

The present invention relates generally to an apparatus for a deployable drop phone. More specifically, the present invention integrates a variety of surveillance equipment and concealed weapons systems into a deployable field communication station.

BACKGROUND OF THE INVENTION

Hostage rescue, conflict mediation, and any form of negotiation with a barricaded suspect must begin with a secure, dependable line of communication between law enforcement and a subject. This need is occasionally fulfilled by using cell phones or landlines present on-site, but this cannot always be relied upon for evolving situations. Further, reliance on existing infrastructure limits the options of law enforcement to sever the power or data connections of a building to isolate a subject. Existing 'field-phones' or 'throw phones' exist and are available, but these systems do not fully utilize the opportunity afforded to law enforcement to place their own equipment into contact with a subject.

The present invention aims to provide a means of covertly surveilling a subject while simultaneously providing overt means of establishing communications between an operator and said subject. The surveillance functions are further complemented by active measures triggerable by the operator, remotely. These active measures will ideally provide tactical options to disable or distract a subject while law enforcement works to rescue hostages, secure facilities, or apprehend any suspects present during a siege or barricaded-suspect scenario.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

Figure 1:
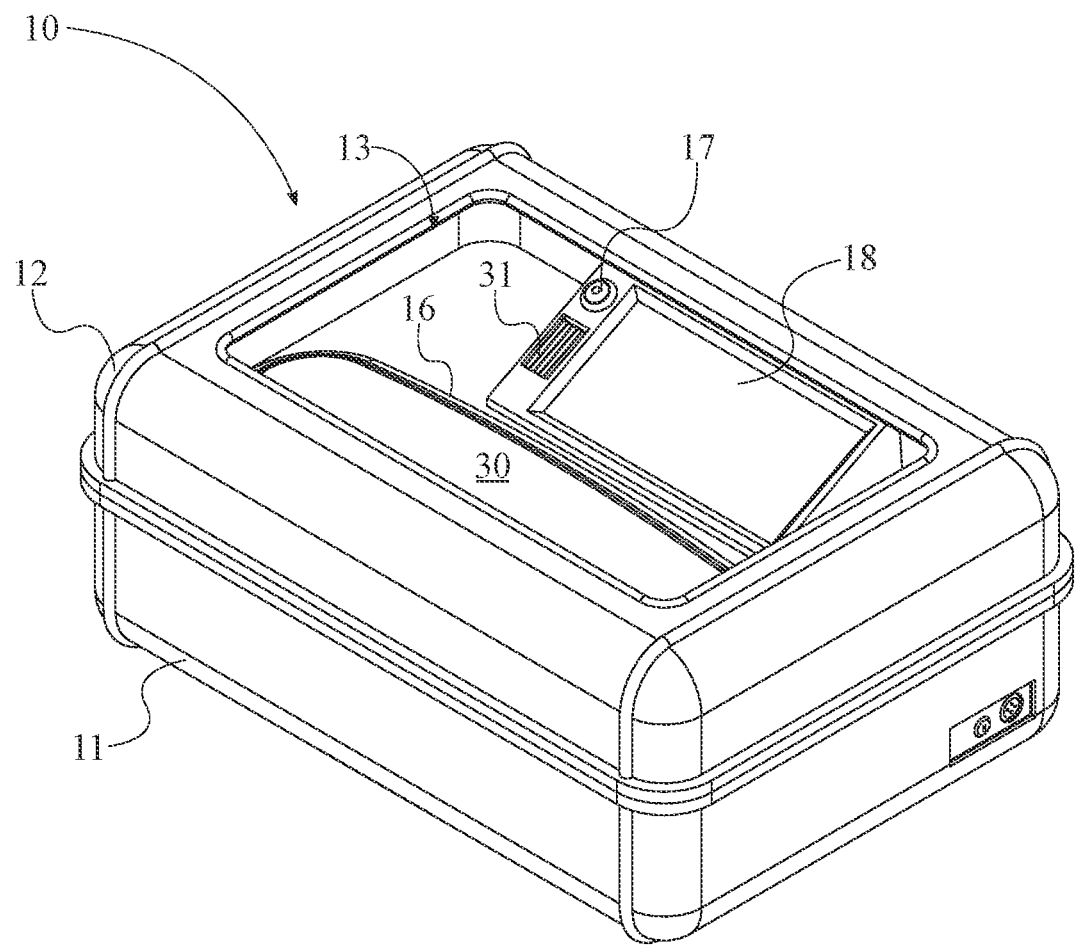
FIG. 1 is a top-front-left perspective view of one embodiment of the present invention, wherein the present invention is sealed closed for transport or in preparation for deployment.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

In reference to FIG. 1 through 9, the present invention is a tactical communication apparatus comprising a casing 10, at least one communications device 15, at least one processing unit 36, a transceiver array 37, at least one remote terminal 40, a plurality of discrete surveillance devices 29, at least one offensive device 20, and a power supply 38. The casing 10 broadly refers to any hardened, shock-absorbing container of suitable dimensions to contain or support the various components of the present invention as described herein. Likewise, the processing unit 36 refers broadly to any type, variety, or arrangement of logical processing unit 36 or data handling assembly that may be required to support the functions of the at least one communications device 15, the plurality of discrete surveillance devices 29, and the at least one offensive device 20 as a contiguous electronic assembly as outlined in FIG. 9. The power supply 38 is also broadly contemplated to define any form of sealed electrical power source of suitable specification to support the operations of the present invention for extended periods.

The transceiver array 37 constitutes a composite radio hub assembly configured or configurable to operate across any range or frequency band as may be encountered in a modern setting. Examples include, but are not limited to, wireless internet (WiFi), local radio bands (NFC, Bluetooth), traditional short-wave radio, cellular network links, and satellite-linked communications methods. The at least one remote terminal 40 refers to any secondary devices used to communicate with a user of the present invention, generally referring to a laptop or other mobile device that is compatible with the transceiver array 37.

The plurality of discrete surveillance devices 29 is arranged throughout the casing 10 to provide an omnidirectional field of observation and detection to the operator of the at least one remote terminal. The plurality of discrete surveillance devices 29 is specifically intended as disguised or otherwise concealed components of the present invention, thereby enabling the operator to surveil a target area without alerting a subject to any ongoing surveillance.

The at least one offensive device 20 constitutes a concealed weapon or weapons system configured to distract, disable, or terminate a subject on command from the at least one remote terminal. Like the plurality of discrete surveillance devices 29, the at least one offensive device 20 is camouflaged, concealed, or otherwise hidden from the unwitting subject to maintain the element of surprise in a tactical situation.

In more specific terms the at least one communications device 15 is externally mounted to the casing 10 to present the subject with a seemingly 'obvious' point of engagement. The transceiver array 37 is also mounted to the casing 10, with the transceiver array 37 being electronically connected to the at least one communications device 15, the at least one processing unit 36, the at least one offensive device 20, and the plurality of discrete surveillance devices 29. This arrangement enables the remote operation of each component of the present invention, regardless of damage or malfunction of any individual component. Accordingly, the at least one remote terminal 40 is wirelessly connected to the transceiver array 37.

The plurality of discrete surveillance devices 29 is externally distributed across the casing 10, wherein the plurality of discrete surveillance devices 29 is configured to surreptitiously transmit data to the at least one remote terminal 40 through the transceiver array 37 as previously outlined. In reference to FIGS. 3, 4, and 7 the plurality of discrete surveillance devices 29 may be positioned beneath or adjacent to features of the casing 10 that obstruct a casual observer from noticing the exposed portions of the plurality of discrete surveillance devices 29. This arrangement may be supplemented with transparent materials, camouflaging structures, or other forms of visual misdirection to maintain concealment of the exposed portions of the plurality of discrete surveillance devices 29 in various alternate embodiments.

The at least one offensive device 20 being mounted into the casing 10, wherein the at least one offensive device 20 is directed and operated remotely via the at least one remote terminal. Positioning and concealment of the at least one offensive device 20 is generally contemplated to follow the same rules for concealment and camouflage as the plurality of discrete surveillance devices 29. Ideally, the true functionality of the at least one offensive device 20 cannot be determined through casual observation by an uninformed subject. The concealment of the at least one offensive device 20 is considered essential to maintain trust with a potentially combative subject, and to retain the element of surprise to maximize the effectiveness of the at least one offensive device 20.

Figure 6:
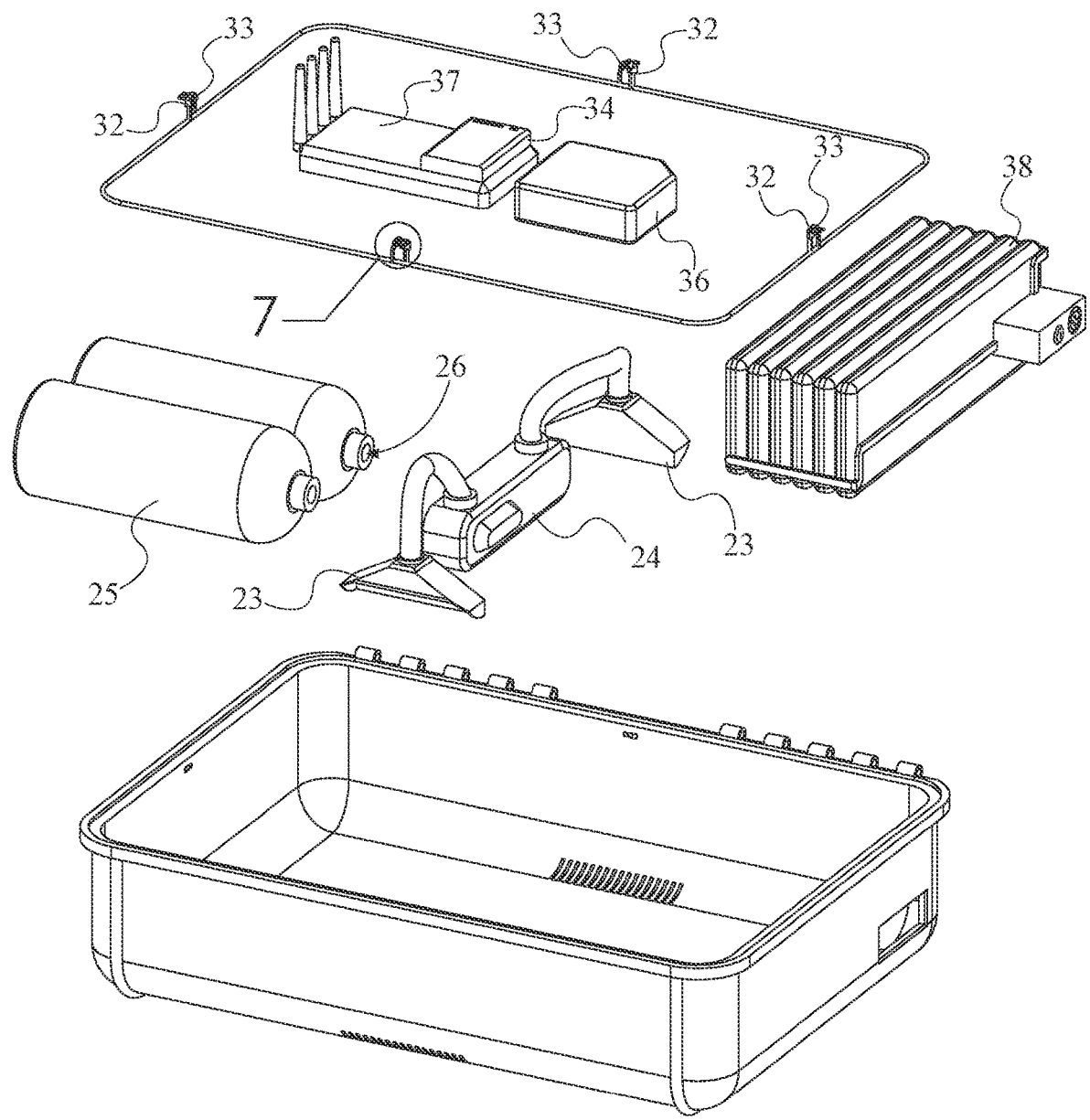
FIG. 6 is an exploded perspective view of the present invention, wherein the upper portions of the present invention are omitted to show internal construction.
Figure 7:
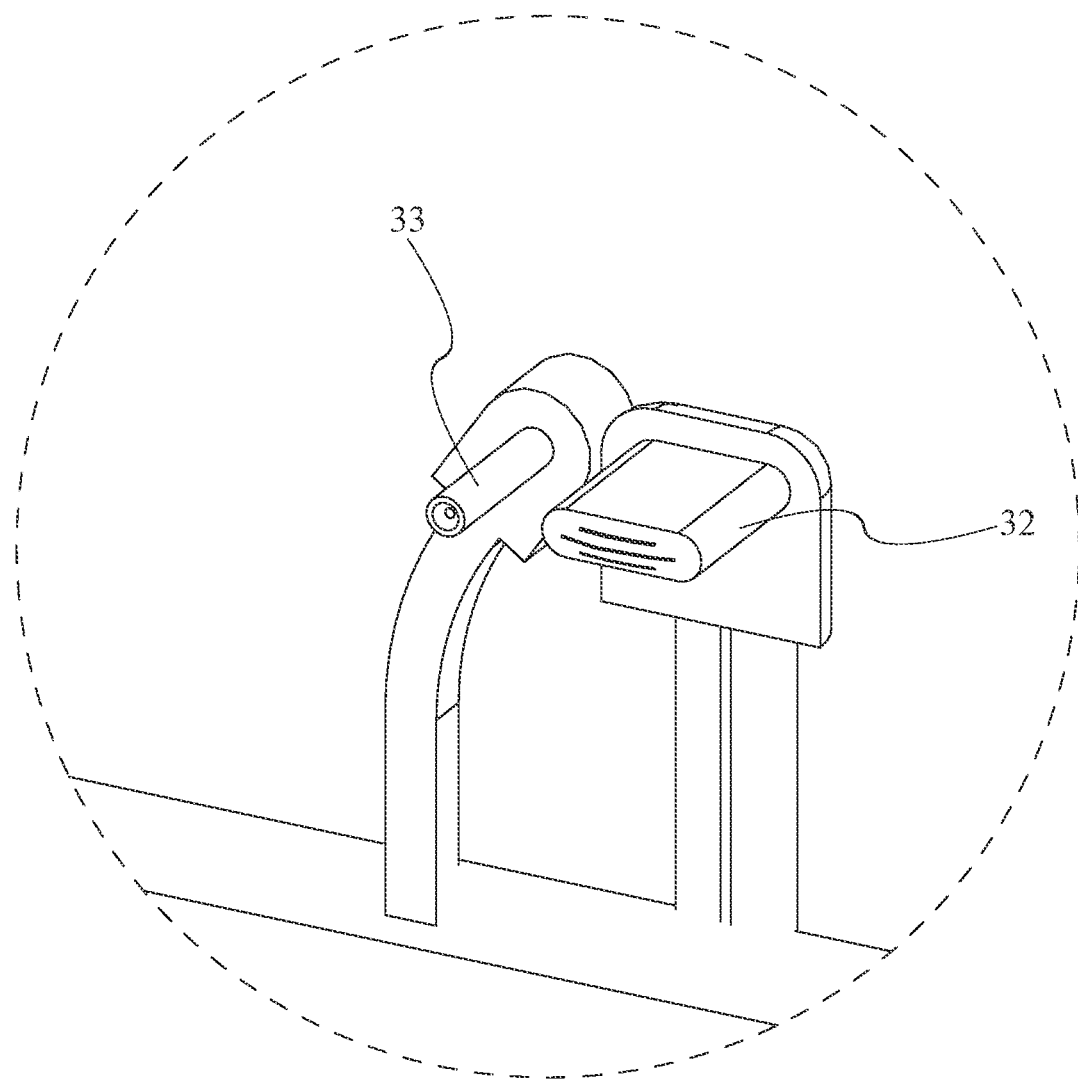
FIG. 7 is a detail view of area 7 in FIG. 6.

As outlined above, the power supply 38 is mounted into the casing 10 to provide electrical power to the various electronic devices comprising the present invention. More specifically, the power supply 38 is electrically connected to the at least one communications device 15, at least one processing unit 36, the transceiver array 37, the plurality of discrete surveillance devices 29, and the at least one offensive device 20. Referring to FIG. 6 the power supply 38 is ideally an oversized cellular battery with suitable capacity to permit extended operation, thereby eliminating the need to deploy a second instance of the present invention in the event of an extended siege.

Figure 2:
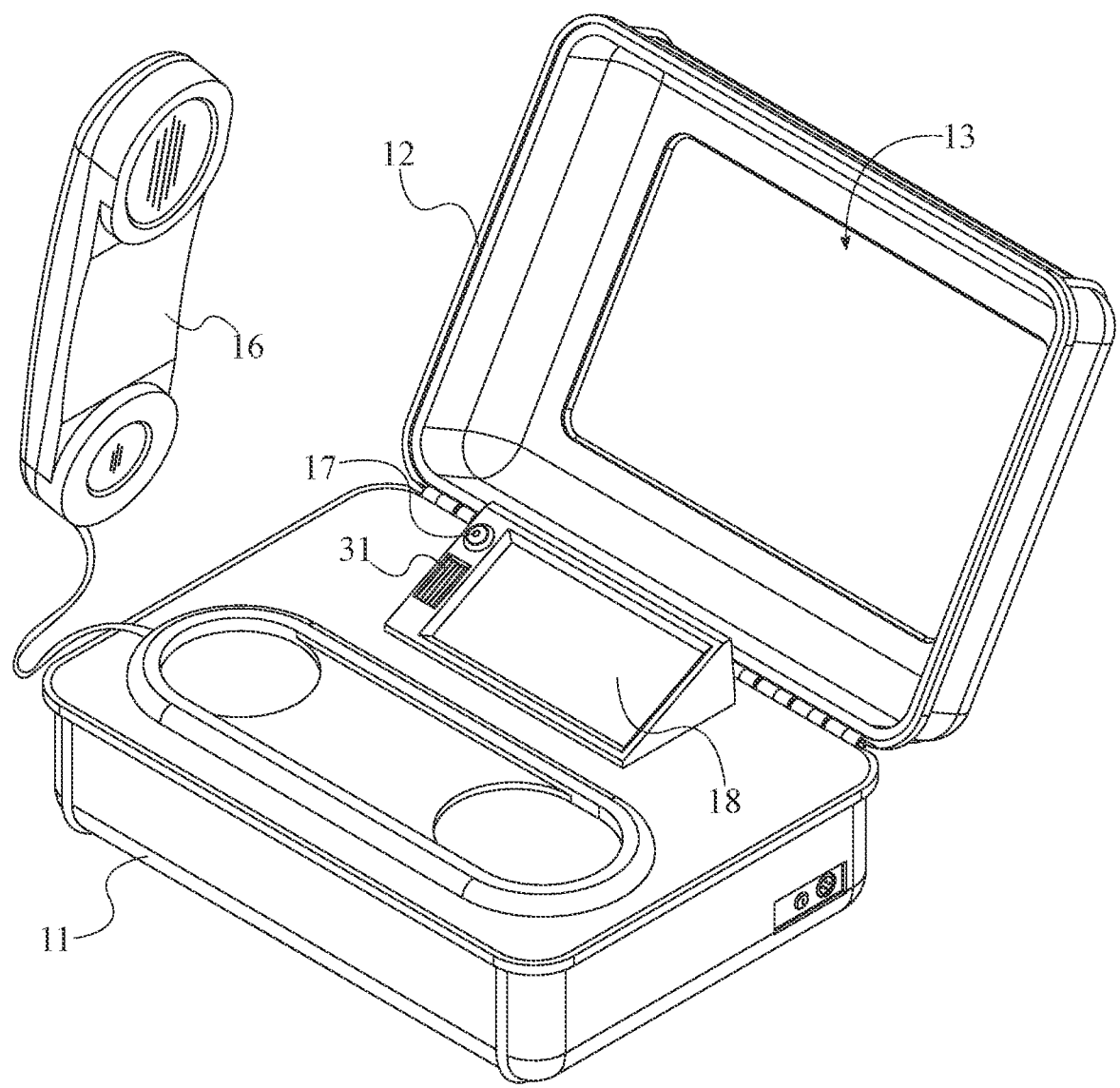
FIG. 2 is a perspective view thereof, wherein the present invention is deployed for use.
Figure 3:
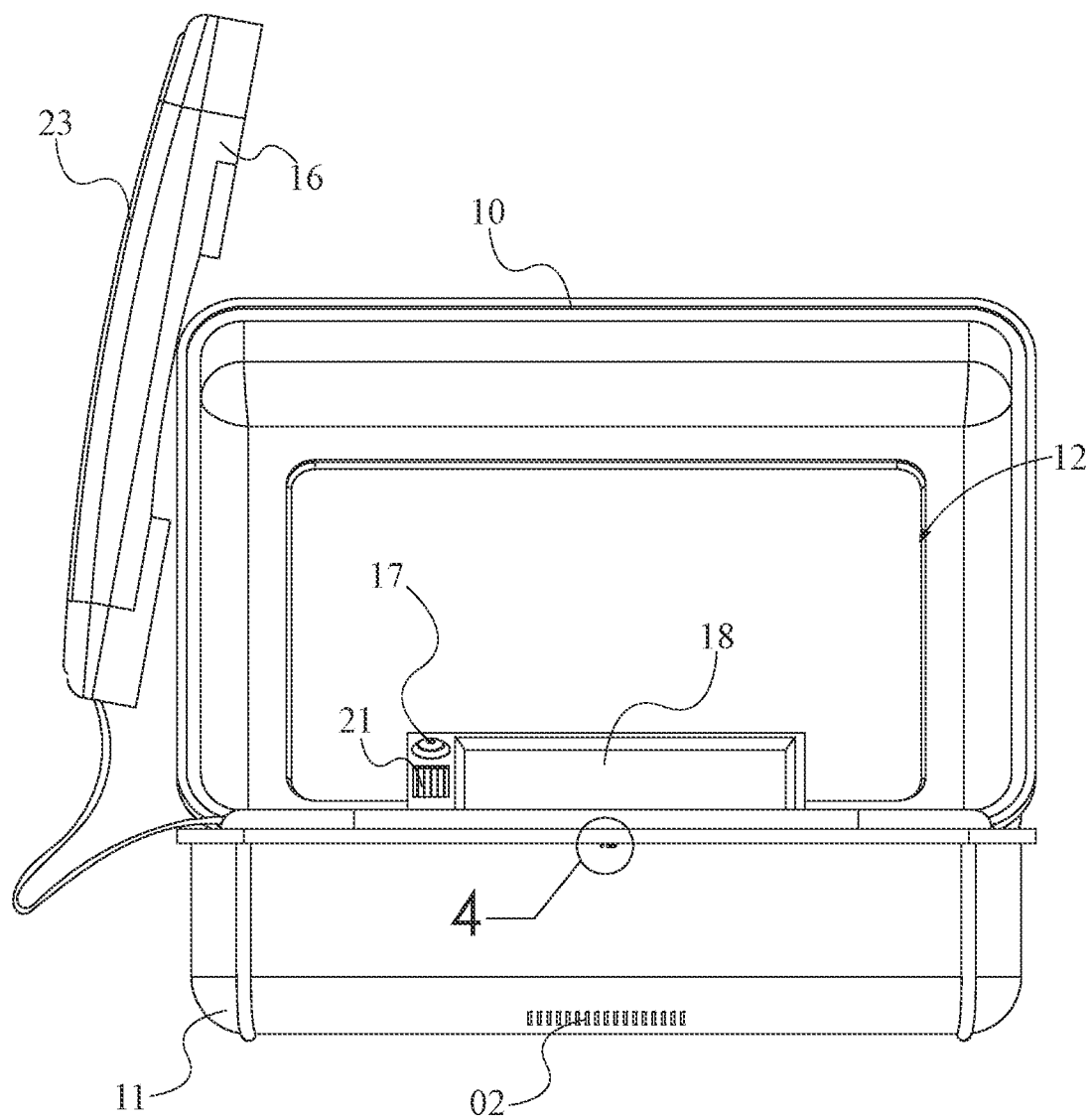
FIG. 3 is a front elevational view thereof.
Figure 4:
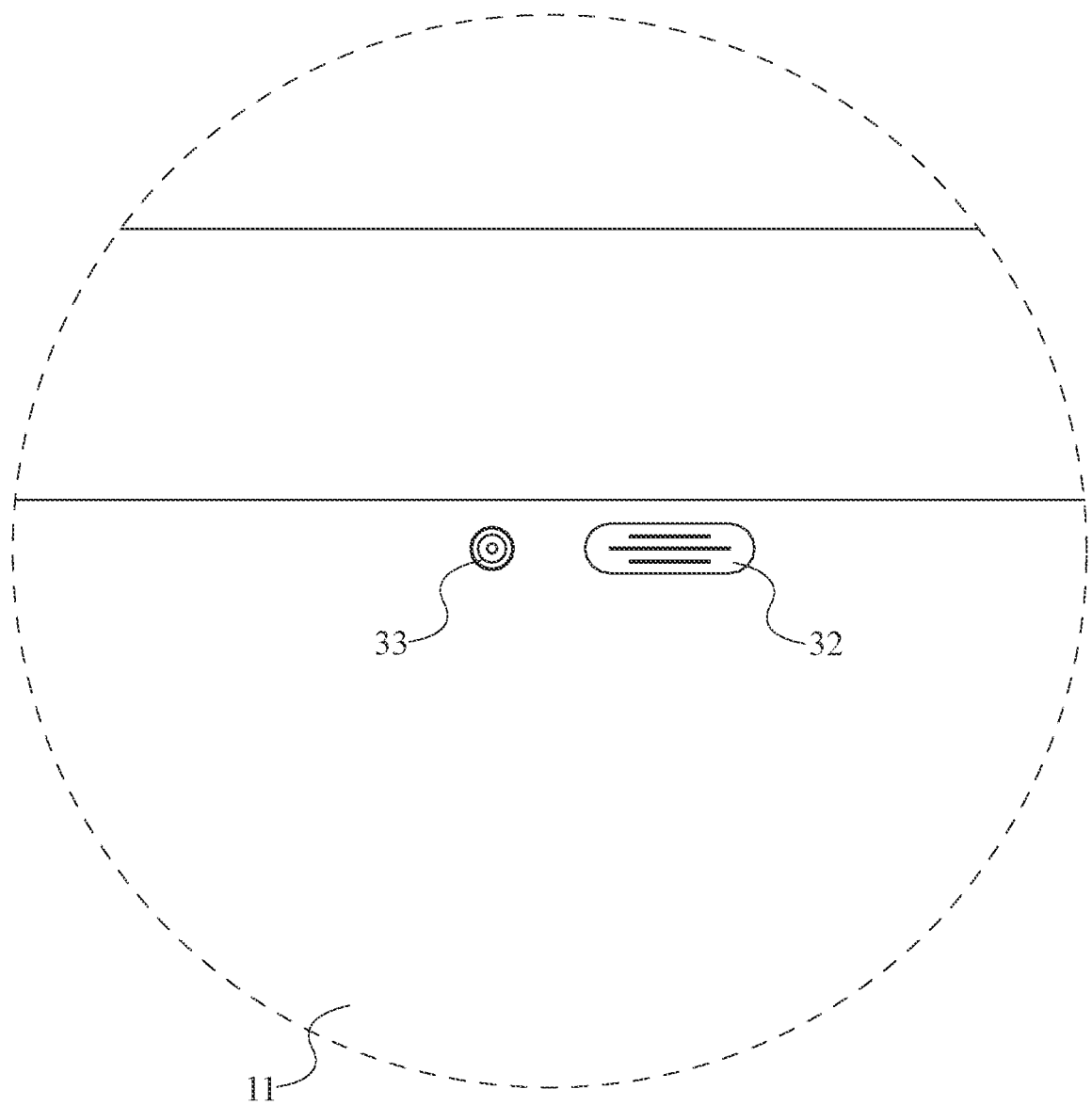
FIG. 4 is a detail view of area 4 in FIG. 3.
Figure 5:
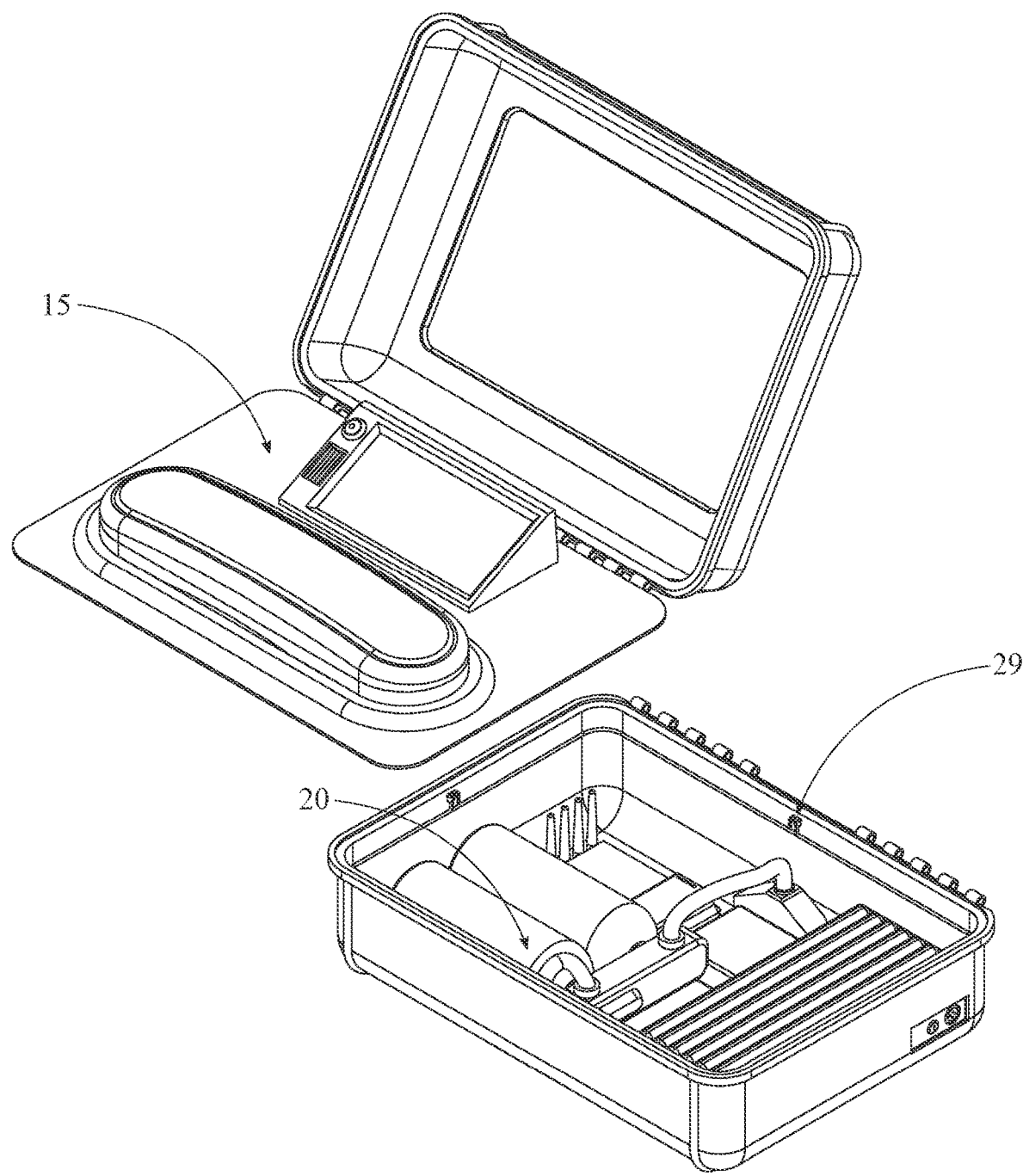
FIG. 5 is a partially exploded view of the present invention, wherein the present invention is subdivided into two major subassemblies.

In one embodiment of the present invention, the at least one communications device 15 comprising a handset 16. As illustrated in FIGS. 2 and 3, the handset 16 outwardly appears to constitute a conventional handheld telephone receiver with the included speaker-and-microphone functionalities typically supported therein. However, the plurality of discrete surveillance devices 29 comprising at least one sensor pad 30 mounted to the exterior of the handset 16. The at least one sensor pad 30 is preferably a camouflaged or otherwise inconspicuous capacitive surface configured to detect biometric data, specifically the heartrate, fingerprints, and palmprints of any subject holding the handset 16. Further, the handset 16 is communicably coupled to the at least one remote terminal 40 through the transceiver array 37. The handset 16 is configured to enable audio communication with the at least one remote terminal, ideally via a preconditioned or preset number encoded into the at least one communication device. This functionality may be expanded further with integrated callback functionalities and number programming via the at least one processing unit 36 in at least one embodiment of the present invention. This functionality may additionally support multiple outgoing calls simultaneously, thereby enabling the audio stream to be rendered at multiple sites simultaneously for monitoring, analysis, and recording.

Figure 8:
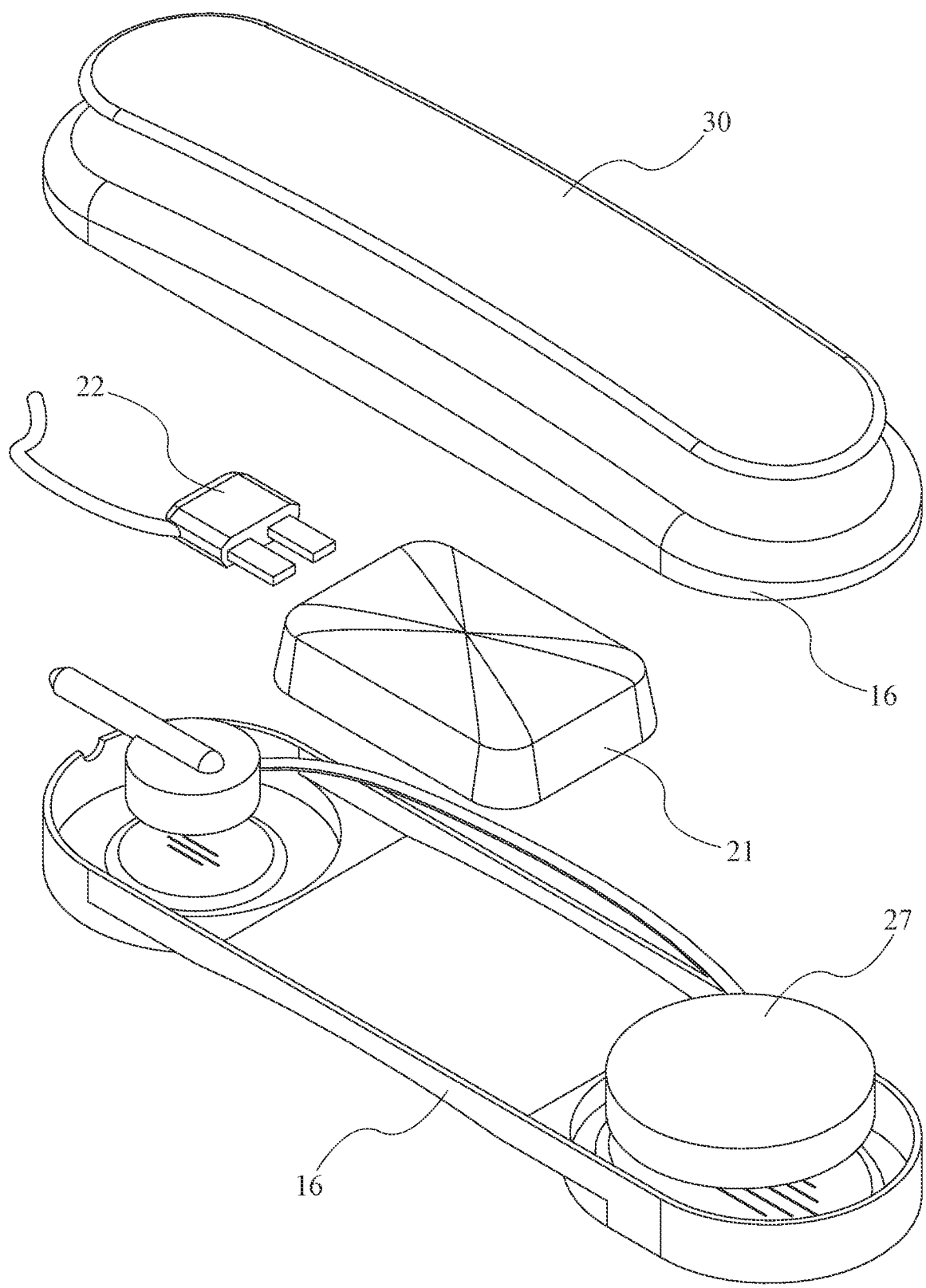
FIG. 8 is a focused exploded view of a handheld section of the present invention, wherein the direction and arrangement of an exemplary explosive device is shown.
Figure 9:
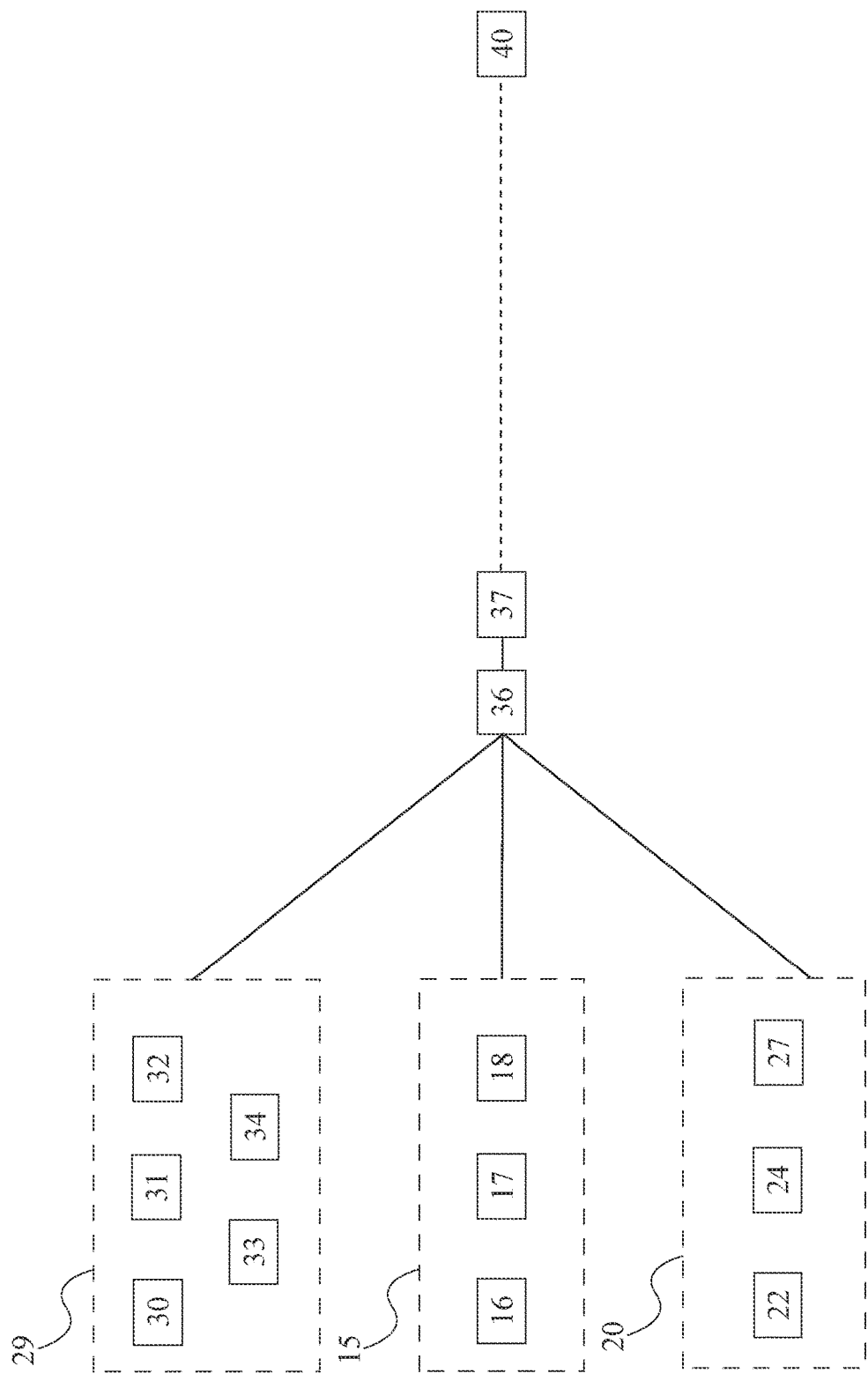
FIG. 9 is a schematic view of the electronic components of the present invention.

The natural ergonomics of the handset 16 additionally support a lethal embodiment of the at least one offensive device 20. As shown in FIG. 8 the at least one offensive device 20 comprises a shaped charge 21 and an ignition cap 22, with the shaped charge 21 being mounted into the handset 16 facing towards a subject's head as the handset 16 is held in-use. The ignition cap 22 is engaged into the shaped charge 21 and the ignition cap 22 is configured to detonate the shaped charge 21 via the at least one remote terminal. This embodiment enables an operator to instantly kill or seriously injure the user of the handset 16, if necessary; this functionality instantly resolves a siege or provides a tactical advantage to an assault-in-progress.

In at least one embodiment, a negotiator may benefit from a more personal, face-to-face conversation with a subject. In lieu of this for practical reasons, video conferencing is supported by the at least one communications device 15 in at least one embodiment. As shown in FIGS. 2 and 3, at least one communications device 15 comprises a forward-facing camera 17 and a display 18. The display 18 and the forward-facing camera 17 are communicably coupled to the remote terminal 40 through the transceiver array 37, wherein the display 18 and the forward-facing camera 17 are configured to enable video communication with the at least one remote terminal. This arrangement generally suggests an embodiment of the remote terminal 40 that supports video conferencing, though this is not strictly required for a deployment of the present invention wherein the subject is willing to engage in one-way video transmission. This capacity can be invaluable for an operator attempting to read facial expressions, body language, or any other 'tells' that may betray the subjects mental state, intentions, or truthfulness. In support of this, the plurality of discrete surveillance devices 29 comprises an infrared sensor 31 mounted adjacent to the forward-facing camera 17, wherein the infrared sensor 31 is configured to monitor localized body heat. This functionality enables an operator to detect a variety of biological signs indicating stress, generally correlating to dishonesty or imminent violent action. The application of the visual-spectrum 'tells' and the infrared may be combined into a comprehensive insight to a subject's mental state, broadly termed 'the psychology of a conversation'. This insight may be crucial to bringing a siege or standoff to a peaceable solution, or at least avert outright disaster by unintentionally agitating a subject into a rash action.

As important as the content of a conversation may be, it may be equally important to know who a subject is. This is particularly useful with the advent of biometric and facial-imprint databases, wherein a subject's personal dossier may be recovered even if they are uncooperative in identifying themselves. Accordingly, at least one processing unit 36 is electronically connected to the at least one communications device 15 and the transceiver array 37, wherein the at least one processing unit 36 is configured to execute a facial recognition algorithm on a video stream transmitted between the at least one communications device 15 and the at least one remote terminal. The facial recognition algorithm may be performed on-site by the at least one processing unit 36, or the at least one processing unit 36 may provide automatic selecting of visual data for an external search engine without departing from the original spirit and scope of the present invention.

Further, there is no certainty that an operator and a subject will be able to communicate in the same language, and absolutely no guarantee that a suitable-knowledgeable operator will be available. In lieu of a native speaker or trained linguist, the present invention may provide a means to hold rudimentary conversations in a common tongue. The at least one processing unit 36 is electronically connected to the at least one communications device 15 and the transceiver array 37, wherein the at least one processing unit 36 is configured to execute a language processing algorithm on an audio stream transmitted between the at least one communications device 15 and the at least one remote terminal. The language processing algorithm broadly encompasses a bidirectional transliteration function for both the operator and the subject, with a context-aware linguistic conversion performed between the two parties. This translation is ideally rendered as spoken words but may also be rendered as text for clarity or recording purposes.

In one embodiment of the present invention, the plurality of discrete surveillance devices 29 is specifically directed towards the collection of ambient sounds, specifically targeting seemingly private conversations held by subjects that are not directed towards the at least one communications device 15. In this embodiment, the plurality of discrete surveillance devices 29 comprising a plurality of ambient microphones 32 that are distributed across the exterior of the casing 10. The plurality of ambient microphones 32 is electronically connected to the transceiver array 37, wherein the transceiver array 37 is configured to transmit audio data to the at least one remote terminal 40 from the plurality of ambient microphones 32.

In another embodiment of the present invention, the plurality of discrete surveillance devices 29 is primarily directed towards covertly viewing the deployment area around a subject, specifically including areas that a subject believes to be outside of the viewing angle of the at least one communications device 15. Accordingly, the plurality of discrete surveillance devices 29 comprises a plurality of pinhole cameras 33 distributed across the exterior of the casing 10. The plurality of pinhole cameras 33 is electronically connected to the transceiver array 37, wherein the transceiver array 37 is configured to transmit visual data to the at least one remote terminal 40 from the plurality of pinhole cameras 33.

It is further considered that the subjects or subjects may be using wireless communications devices of their own to coordinate. Accessing this internal network may provide valuable insight to the plans and intentions of any subjects, particularly if the subjects does not know that their communications are being accessed. Accordingly, the plurality of discrete surveillance devices 29 comprises at least one network tap 34 mounted into the casing 10. The at least one network tap 34 is communicably coupled to the at least one remote terminal 40 through the transceiver array 37, wherein the at least one network tap 34 is configured to monitor local wireless signals and relay the local wireless signals to the at least one remote terminal. Across various embodiments, the at least one network tap 34 may engage with the transceiver array 37 to access a greater range of transmission bands or to boost the gain of the at least one network tap 34 as a secondary antenna.

In addition to the lethal option already outlined above, the at least one offensive device 20 may be employed as a less-lethal tool in at least one embodiment. Accordingly, the at least one offensive device 20 comprises a plurality of dispersal nozzles 23, at least one nozzle actuator 24, a reservoir 25, and a volume of riot control agent 26 as shown in FIG. 6. The plurality of dispersal nozzles 23 is mounted across the exterior of the casing 10 with the reservoir 25 being in fluid communication with each of the plurality of dispersal nozzles 23 through the at least one nozzle actuator 24. The at least one nozzle actuator 24 ideally defines an electronic solenoid valve configured to vent the contents of the reservoir 25 out through the plurality of dispersal nozzles 23. The plurality of dispersal nozzles 23 is ideally concealed or camouflaged to disguise any functionality, like the plurality of discrete surveillance devices 29. The at least one nozzle actuator 24 is further communicably coupled to the at least one remote terminal 40 through the transceiver array 37 to enable remote operation of the at least one nozzle actuator 24. The volume of riot control agent 26 is contained within the reservoir 25, wherein the volume of riot control agent 26 is aerosolized through the plurality of dispersal nozzles 23 on command from the at least one remote terminal. The volume of riot control agent 26 ideally constitutes an irritant gas suitable for concealing an entry team or providing a distraction for some other operation, but a neutral obscurant fog may also be deployed in at least one embodiment.

At least one embodiment of the at least one offensive device 20 comprises an infrasonic acoustic generator 27 mounted to the exterior of the casing 10, adjacent to the at least one communications device 15. Extended exposure to varied infrasonic sound patterns can be used to agitate a subject, controllably instilling discomforting conditions like nausea, disorientation, dizziness, sleeplessness, deafness, or total incapacitation depending on the output amplitude. This functionality may be employed over long-term sieges to weaken a subject's resistance without ever alerting them to the exact mechanism of attack. More generally, the infrasonic acoustic generator 27 is communicably coupled to the at least one remote terminal 40 through the transceiver array 37, wherein the infrasonic acoustic generator 27 is configured to produce disorienting patterns of sound.

It is generally understood that the present invention is to be used in hazardous environments and cannot risk malfunction due to impact or shock damage. Accordingly, the casing 10 comprises a ruggedized body 11, a cover panel 12, and at least one transparent section 13 as shown in FIGS. 1 and 2. The ruggedized body 11 encloses and braces the transceiver array 37, the plurality of discrete surveillance devices 29, the at least one offensive device 20, and the power supply 38 to prevent any of these relatively fragile components from suffering damage if the casing 10 suffers an external strike. The cover panel 12 is hingedly mounted to the ruggedized body 11 over the at least one communications device 15 to protect the breakable items arranged therein while the casing 10 is sealed for transport or deployment. The at least one transparent section 13 is formed into the cover panel 12 adjacent to the at least one communications device 15, wherein the at least one communications device 15 is visible through the at least one transparent section 13. This 'framing' of the at least one communications device 15 makes the intended use of the present invention obvious to a subject without compromising the protective qualities of the casing 10. Further, the at least one transparent section 13 is positioned to draw attention away from any visible portions of the plurality of discrete surveillance devices 29 or the at least one offensive device 20 by visually emphasizing the at least one communications device 15.

Although the invention has been explained in relation to its preferred embodiment, it is to be understood that many other possible modifications and variations can be made without departing from the spirit and scope of the invention as hereinafter claimed.

What is claimed is:

1. A tactical communication apparatus comprising:
    a casing;
    at least one communications device;
    at least one processing unit;
    a transceiver array;
    at least one remote terminal;
    a plurality of discrete surveillance devices;
    at least one offensive device;
    a power supply;
    the at least one communications device being externally mounted to the casing;
    the transceiver array being mounted to the casing;
    the transceiver array being electronically connected to the at least one communications device, the at least one processing unit, the at least one offensive device, and the plurality of discrete surveillance devices;
    the at least one remote terminal being wirelessly connected to the transceiver array;
    the plurality of discrete surveillance devices being externally distributed across the casing, wherein the plurality of discrete surveillance devices is configured to surreptitiously transmit data to the at least one remote terminal through the transceiver array;
    the at least one offensive device being mounted into the casing, wherein the at least one offensive device is directed and operated remotely via the at least one remote terminal;
    the power supply being mounted into the casing; and
    the power supply being electrically connected to the at least one communications device, at least one processing unit, the transceiver array, the plurality of discrete surveillance devices, and the at least one offensive device.

2. The tactical communication apparatus as claimed in claim 1 comprising:
    the at least one communications device comprising a handset;
    the plurality of discrete surveillance devices comprising at least one sensor pad;
    the handset being communicably coupled to the at least one remote terminal through the transceiver array, wherein the handset is configured to enable audio communication with the at least one remote terminal; and
    the at least one sensor pad being mounted to the exterior of the handset, wherein the at least one sensor pad is configured to detect biometric data.

3. The tactical communication apparatus as claimed in claim 2 comprising:
    the at least one offensive device comprising a shaped charge and an ignition cap;
    the shaped charge being mounted into the handset; and
    the ignition cap engaged into the shaped charge, wherein the ignition cap is configured to detonate the shaped charge via the at least one remote terminal.

4. The tactical communication apparatus as claimed in claim 1 comprising:
    the at least one communications device comprising a forward-facing camera and a display;
    the plurality of discrete surveillance devices comprising an infrared sensor;
    the display and the forward-facing camera being communicably coupled to the remote terminal through the transceiver array, wherein the display and the forward-facing camera are configured to enable video communication with the at least one remote terminal; and
    the infrared sensor being mounted adjacent to the forward-facing camera, wherein the infrared sensor is configured to monitor localized body heat.

5. The tactical communication apparatus as claimed in claim 4 comprising:
    the at least one processing unit being electronically connected to the at least one communications device and the transceiver array, wherein the at least one processing unit is configured to execute a facial recognition algorithm on a video stream transmitted between the at least one communications device and the at least one remote terminal.

6. The tactical communication apparatus as claimed in claim 1 comprising:
    the at least one processing unit being electronically connected to the at least one communications device and the transceiver array, wherein the at least one processing unit is configured to execute a language processing algorithm on an audio stream transmitted between the at least one communications device and the at least one remote terminal.

7. The tactical communication apparatus as claimed in claim 1 comprising:
    the plurality of discrete surveillance devices comprising a plurality of ambient microphones;
    the plurality of ambient microphones being distributed across the exterior of the casing; and
    the plurality of ambient microphones being electronically connected to the transceiver array, wherein the transceiver array is configured to transmit audio data to the at least one remote terminal from the plurality of ambient microphones.

8. The tactical communication apparatus as claimed in claim 1 comprising:
    the plurality of discrete surveillance devices comprising a plurality of pinhole cameras;
    the plurality of pinhole cameras being distributed across the exterior of the casing; and
    the plurality of pinhole cameras being electronically connected to the transceiver array, wherein the transceiver array is configured to transmit visual data to the at least one remote terminal from the plurality of pinhole cameras.

9. The tactical communication apparatus as claimed in claim 1 comprising:
    the plurality of discrete surveillance devices comprising at least one network tap;
    the at least one network tap being mounted into the casing; and
    the at least one network tap being communicably coupled to the at least one remote terminal through the transceiver array, wherein the at least one network tap is configured to monitor local wireless signals and relay the local wireless signals to the at least one remote terminal.

10. The tactical communication apparatus as claimed in claim 1 comprising:
the at least one offensive device comprising a plurality of dispersal nozzles, at least one nozzle actuator, a reservoir, and a volume of riot control agent;
the plurality of dispersal nozzles being mounted across the exterior of the casing;
the reservoir being in fluid communication with each of the plurality of dispersal nozzles through the at least one nozzle actuator;
the at least one nozzle actuator being communicably coupled to the at least one remote terminal through the transceiver array; and
the volume of riot control agent being contained within the reservoir, wherein the volume of riot control agent is aerosolized through the plurality of dispersal nozzles.

11. The tactical communication apparatus as claimed in claim 1 comprising:
the at least one offensive device comprising an infrasonic acoustic generator;
the infrasonic acoustic generator being mounted to the exterior of the casing, adjacent to the at least one communications device; and
the infrasonic acoustic generator being communicably coupled to the at least one remote terminal through the transceiver array, wherein the infrasonic acoustic generator is configured to produce disorienting patterns of sound.

12. The tactical communication apparatus as claimed in claim 1 comprising:
the casing comprising a ruggedized body, a cover panel, and at least one transparent section;
the ruggedized body enclosing and bracing the transceiver array, the plurality of discrete surveillance devices, the at least one offensive device, and the power supply;
the cover panel being hingedly mounted to the ruggedized body over the at least one communications device; and
the at least one transparent section being formed into the cover panel adjacent to the at least one communications device, wherein the at least one communications device is visible through the at least one transparent section.

13. The tactical communication apparatus comprising:
a casing;
at least one communications device;
at least one processing unit;
a transceiver array;
at least one remote terminal;
a plurality of discrete surveillance devices;
at least one offensive device;
a power supply;
the at least one communications device being externally mounted to the casing;
the transceiver array being mounted to the casing;
the transceiver array being electronically connected to the at least one communications device, the at least one processing unit, the at least one offensive device, and the plurality of discrete surveillance devices;
the at least one remote terminal being wirelessly connected to the transceiver array;
the plurality of discrete surveillance devices being externally distributed across the casing, wherein the plurality of discrete surveillance devices is configured to surreptitiously transmit data to the at least one remote terminal through the transceiver array;
the at least one offensive device being mounted into the casing, wherein the at least one offensive device is directed and operated remotely via the at least one remote terminal;
the power supply being mounted into the casing;
the power supply being electrically connected to the at least one communications device, at least one processing unit, the transceiver array, the plurality of discrete surveillance devices, and the at least one offensive device;
the at least one communications device comprising a handset;
the plurality of discrete surveillance devices comprising at least one sensor pad;
the handset being communicably coupled to the at least one remote terminal through the transceiver array, wherein the handset is configured to enable audio communication with the at least one remote terminal;
the at least one sensor pad being mounted to the exterior of the handset, wherein the at least one sensor pad is configured to detect biometric data;
the at least one communications device comprising a forward-facing camera and a display;
the plurality of discrete surveillance devices comprising an infrared sensor;
the display and the forward-facing camera being communicably coupled to the remote terminal through the transceiver array, wherein the display and the forward-facing camera are configured to enable video communication with the at least one remote terminal;
the infrared sensor being mounted adjacent to the forward-facing camera, wherein the infrared sensor is configured to monitor localized body heat;
the casing comprising a ruggedized body, a cover panel, and at least one transparent section;
the ruggedized body enclosing and bracing the transceiver array, the plurality of discrete surveillance devices, the at least one offensive device, and the power supply;
the cover panel being hingedly mounted to the ruggedized body over the at least one communications device;
the at least one transparent section being formed into the cover panel adjacent to the at least one communications device, wherein the at least one communications device is visible through the at least one transparent section;
the plurality of discrete surveillance devices comprising a plurality of ambient microphones;
the plurality of ambient microphones being distributed across the exterior of the casing;
the plurality of ambient microphones being electronically connected to the transceiver array, wherein the transceiver array is configured to transmit audio data to the at least one remote terminal from the plurality of ambient microphones;
the plurality of discrete surveillance devices comprising a plurality of pinhole cameras;
the plurality of pinhole cameras being distributed across the exterior of the casing; and
the plurality of pinhole cameras being electronically connected to the transceiver array, wherein the transceiver array is configured to transmit visual data to the at least one remote terminal from the plurality of pinhole cameras.

14. The tactical communication apparatus as claimed in claim 13 comprising:
the at least one offensive device comprising a shaped charge and an ignition cap;
the shaped charge being mounted into the handset; and the ignition cap engaged into the shaped charge, wherein the ignition cap is configured to detonate the shaped charge via the at least one remote terminal.

15. The tactical communication apparatus as claimed in claim 13 comprising:
the at least one processing unit being electronically connected to the at least one communications device and the transceiver array, wherein the at least one processing unit is configured to execute a facial recognition algorithm on a video stream transmitted between the at least one communications device and the at least one remote terminal.

16. The tactical communication apparatus as claimed in claim 1 comprising:
the at least one processing unit being electronically connected to the at least one communications device and the transceiver array, wherein the at least one processing unit is configured to execute a language processing algorithm on an audio stream transmitted between the at least one communications device and the at least one remote terminal.

17. The tactical communication apparatus as claimed in claim 1 comprising:
the plurality of discrete surveillance devices comprising at least one network tap;
the at least one network tap being mounted into the casing; and
the at least one network tap being communicably coupled to the at least one remote terminal through the transceiver array, wherein the at least one network tap is configured to monitor local wireless signals and relay the local wireless signals to the at least one remote terminal.

18. The tactical communication apparatus as claimed in claim 1 comprising:
the at least one offensive device comprising a plurality of dispersal nozzles, at least one nozzle actuator, a reservoir, and a volume of riot control agent;
the plurality of dispersal nozzles being mounted across the exterior of the casing;
the reservoir being in fluid communication with each of the plurality of dispersal nozzles through the at least one nozzle actuator;
the at least one nozzle actuator being communicably coupled to the at least one remote terminal through the transceiver array; and
the volume of riot control agent being contained within the reservoir, wherein the volume of riot control agent is aerosolized through the plurality of dispersal nozzles.

19. The tactical communication apparatus as claimed in claim 1 comprising:
the at least one offensive device comprising an infrasonic acoustic generator;
the infrasonic acoustic generator being mounted to the exterior of the casing, adjacent to the at least one communications device; and
the infrasonic acoustic generator being communicably coupled to the at least one remote terminal through the transceiver array, wherein the infrasonic acoustic generator is configured to produce disorienting patterns of sound.

20. The tactical communication apparatus as claimed in claim 1 comprising:
the casing comprising a ruggedized body, a cover panel, and at least one transparent section;
the ruggedized body enclosing and bracing the transceiver array, the plurality of discrete surveillance devices, the at least one offensive device, and the power supply;
the cover panel being hingedly mounted to the ruggedized body over the at least one communications device; and
the at least one transparent section being formed into the cover panel adjacent to the at least one communications device, wherein the at least one communications device is visible through the at least one transparent section.

* * * * *